(12) United States Patent
Miyawaki et al.

(10) Patent No.: US 10,160,476 B2
(45) Date of Patent: Dec. 25, 2018

(54) STEERING SPLINE TELESCOPING SHAFT, AND STEERING DEVICE

(71) Applicant: JTEKT CORPORATION, Osaka-shi, Osaka (JP)

(72) Inventors: Naoto Miyawaki, Yamatokoriyama (JP); Kenji Higashi, Tenri (JP)

(73) Assignee: JTEKT CORPORATION, Osaka-shi (JP)

( * ) Notice: Subject to any disclaimer, the term of this patent is extended or adjusted under 35 U.S.C. 154(b) by 228 days.

(21) Appl. No.: 15/036,881

(22) PCT Filed: Dec. 15, 2014

(86) PCT No.: PCT/JP2014/083102
§ 371 (c)(1),
(2) Date: May 16, 2016

(87) PCT Pub. No.: WO2015/093426
PCT Pub. Date: Jun. 25, 2015

(65) Prior Publication Data
US 2016/0297465 A1    Oct. 13, 2016

(30) Foreign Application Priority Data

Dec. 17, 2013  (JP) ................. 2013-260345

(51) Int. Cl.
*B62D 1/185*    (2006.01)
*B62D 1/16*     (2006.01)
(Continued)

(52) U.S. Cl.
CPC .............. *B62D 1/185* (2013.01); *B62D 1/16* (2013.01); *B62D 1/20* (2013.01); *F16D 1/101* (2013.01);
(Continued)

(58) Field of Classification Search
CPC .. B62D 1/185; B62D 1/16; F16C 3/03; F16D 1/101
See application file for complete search history.

(56) References Cited

U.S. PATENT DOCUMENTS

| 5,771,737 A | 6/1998 | Yaegashi |
| 5,919,094 A | 7/1999 | Yaegashi |

(Continued)

FOREIGN PATENT DOCUMENTS

| CN | 103314230 A | 9/2013 |
| CN | 103429921 A | 12/2013 |

(Continued)

OTHER PUBLICATIONS

Gunay, Durmus et al. "The Effects of Addemndum Modifciation Coefficient on Tooth Stresses of Spur Gear" Mathematical & Computational Applications (Year: 1996).*

(Continued)

*Primary Examiner* — Karen Beck
(74) *Attorney, Agent, or Firm* — Oliff PLC

(57) ABSTRACT

A spline telescoping shaft includes an inner shaft including a male spline and a tubular outer shaft including a female spline. A resin film is provided on a surface of at least either of both the splines. An addendum modification coefficient e, the number of teeth Z, a module m, a reference pitch circle diameter PCD, a tip circle diameter d1 and a root circle diameter d2 of the male spline and a tip circle diameter D1 and a root circle diameter D2 of the female spline have relations expressed by expressions (1) to (8).

$$m(Z+4)>d1>m(Z+2) \quad (1),$$

$$mZ>d2>m(Z-1) \quad (2),$$

$$m(Z+4)>D2>m(Z+2) \quad (3),$$

(Continued)

$$mZ > D1 > m(Z-1) \quad (4),$$

$$D2 > d1 \quad (5),$$

$$D1 > d2 \quad (6),$$

$$PCD = mZ \quad (7),$$

and $$0.4 < e < 1.1 \quad (8)$$

2 Claims, 4 Drawing Sheets

(51) Int. Cl.
    *B62D 1/20*     (2006.01)
    *F16D 3/06*     (2006.01)
    *F16D 1/10*     (2006.01)
    *F16C 3/03*     (2006.01)

(52) U.S. Cl.
    CPC ............... *F16D 3/06* (2013.01); *F16C 3/03* (2013.01); *F16D 2001/103* (2013.01)

(56) References Cited

U.S. PATENT DOCUMENTS

| | | | |
|---|---|---|---|
| 8,555,745 B2* | 10/2013 | Inoue | B62D 1/195 |
| | | | 280/775 |
| 9,242,667 B2* | 1/2016 | Yoshihara | B62D 1/184 |
| 9,545,943 B2* | 1/2017 | Sakuda | B62D 1/185 |
| 9,623,898 B2* | 4/2017 | Sakuda | B62D 1/185 |
| 2007/0082547 A1 | 4/2007 | Komoto et al. | |
| 2011/0034256 A1 | 2/2011 | Tokioka | |
| 2012/0080258 A1* | 4/2012 | Tokioka | B62D 1/20 |
| | | | 180/444 |
| 2012/0165106 A1* | 6/2012 | Eltner | F16D 3/06 |
| | | | 464/162 |
| 2014/0059832 A1 | 3/2014 | Tokioka | |
| 2014/0187339 A1* | 7/2014 | Kurokawa | B62D 1/16 |
| | | | 464/162 |

FOREIGN PATENT DOCUMENTS

| | | |
|---|---|---|
| EP | 0707157 A1 | 4/1996 |
| GB | 2316150 A | 2/1998 |
| JP | H03-204417 A | 9/1991 |
| JP | H11-247835 A | 9/1999 |
| JP | 2003-117268 A | 4/2003 |
| JP | 2003-276615 A | 10/2003 |
| JP | 2011-038561 A | 2/2011 |
| JP | 2011-174498 A | 9/2011 |
| JP | 6354761 B2 * | 7/2018 ............ F16D 1/101 |
| WO | 2005/046957 A1 | 5/2005 |

OTHER PUBLICATIONS

Tokioka, Ryoichi, JP 2011-38561 ip.com English Machine Translation, Feb. 2011.*
JP 6354761 B2, Dimensions and values taken from figure, Jul. 2018. (Year: 2018).*
Y. Kurokawa, U.S. 2017/0187339, Fig. 3B with values and dimensions, Jul. 2014. (Year: 2014).*
R. Toikioka, JP 2011-38561, Fig. 3 extrapolated with values and dimensions, Aug. 2009. (Year: 2009).*
Jun. 21, 2017 Search Report issued in European Patent Application No. 14871159.1.
Dec. 4, 2017 Office Action issued in Chinese Patent Application No. 201480068026.8.
Mar. 17, 2015 International Search Report issued in International Patent Application No. PCT/JP2014/083102.

* cited by examiner

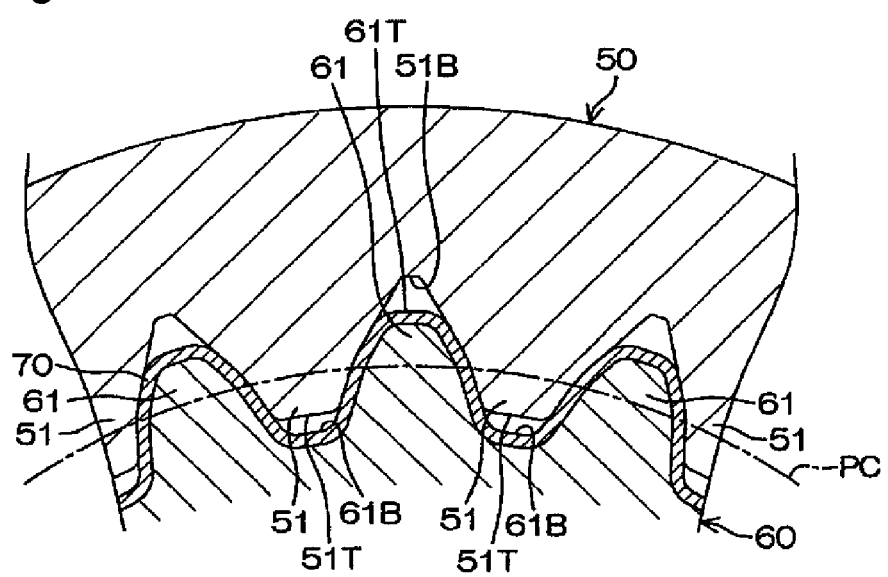

STEERING SPLINE TELESCOPING SHAFT, AND STEERING DEVICE

TECHNICAL FIELD

The present invention relates to a steering spline telescoping shaft and a steering device.

BACKGROUND ART

A telescoping shaft is proposed as a motor vehicle steering shaft in which an inner shaft and an outer shaft are serration fitted together so as not to rotate but to slide axially relative to each other (for example, Patent Literature 1). The profile of serrations normally conforms to the JIS (Japanese Industrial Standards).

CITATION LIST

Patent Literature

[Patent Literature 1] JP-A-2003-276615

SUMMARY OF INVENTION

Technical Problem

In association with the recent demand for high-output electric power steering devices, torque to be transmitted by a steering shaft is getting higher. A pitch circle diameter needs to be increased to increase the torque.

In the case of the pitch circle diameter being increased, however, the outside diameter of the steering shaft needs to be increased to ensure the strength of the steering shaft. In assembling the steering shaft that is increased in the way described above to a vehicle, a layout needs to be considered that avoids the interference with other parts, this deteriorating the mounting performance of the steering shaft to the vehicle.

Then, an object of the invention is to provide a steering spline telescoping shaft that can transmit high torque while ensuring the strength thereof without an increase in size and a steering device that includes the shaft.

Solution to Problem

According to an advantageous aspect of the invention, there is provided a steering spline telescoping shaft that transmits steering torque, comprising:

an inner shaft and a tubular outer shaft that are spline fitted together so as to slide in an axial direction, wherein the outer shaft includes a female spline, wherein the inner shaft includes a male spline that fits in the female spline, wherein a resin film is provided on a surface of at least either of the female spline and the male spline, wherein the female spline and the male spline each have a profile that is modified in a tooth depth direction with an addendum modification coefficient "e", and wherein following expressions (1) to (8) are met:

$$m(Z+4) > d1 > m(Z+2) \quad (1)$$

$$mZ > d2 > m(Z-1) \quad (2)$$

$$m(Z+4) > D2 > m(Z+2) \quad (3)$$

$$mZ > D1 > m(Z-1) \quad (4)$$

$$D2 > d1 \quad (5)$$

$$D1 > d2 \quad (6)$$

$$PCD = mZ \quad (7)$$

$$0.4 < e < 1.1 \quad (8)$$

wherein, in the expressions (1) to (8), Z is a number of teeth of each spline, m is a module, PCD is a reference pitch circle diameter, d1 is a tip circle diameter of the male spline, d2 is a root circle diameter of the male spline, D1 is a tip circle diameter of the female spline, and D2 is a root circle diameter of the female spline.

According to another advantageous aspect of the invention, there is provided A steering device comprising:

a steering member;

a steering mechanism configured to operate in association with the operation of the steering member to turn wheels; and a steering shaft configured to transmit a steering force of the steering member to the steering mechanism, wherein a part of the steering shaft includes the steering spline telescoping shaft described above.

Advantages Effects of Invention

According to the invention, in relation to the inner shaft, the root circle diameter d2 of the external spline is substantially the same as the conventional example as shown by the expression (2), and the tip circle diameter d1 of the external spline is increased as shown by the expression (1), whereby the tooth depth of the external spline is increased. In relation to the outer shaft, the tip circle diameter D1 of the internal spline is substantially the same as the conventional example as shown by the expression (4), and the root circle diameter D2 of the internal spline is increased as shown by the expression (3), whereby the tooth depth of the internal spline is increased. By doing so, with the reference pitch circle diameter shown by the expression (7) kept substantially the same as the conventional example, the contact area between both the splines can be increased. Consequently, the steering shaft can transmit high torque with its strength ensured without an increase in size thereof.

The profile of each spline is modified with the addendum modification coefficient shown by the expression (8), and therefore, there is no such situation that tips are so pointed that they are difficult to be worked.

According to the invention, it is possible to realize the steering device that is small in size and strong in strength and that can transmit high torque.

BRIEF DESCRIPTION OF DRAWINGS

FIG. 3 is a sectional view of the intermediate shaft taken perpendicularly to the axis thereof and taken along a line III-III in FIG. 2.

DESCRIPTION OF EMBODIMENTS

A preferred embodiment of the invention will be described by reference to the accompanying drawings.

Figure 1:
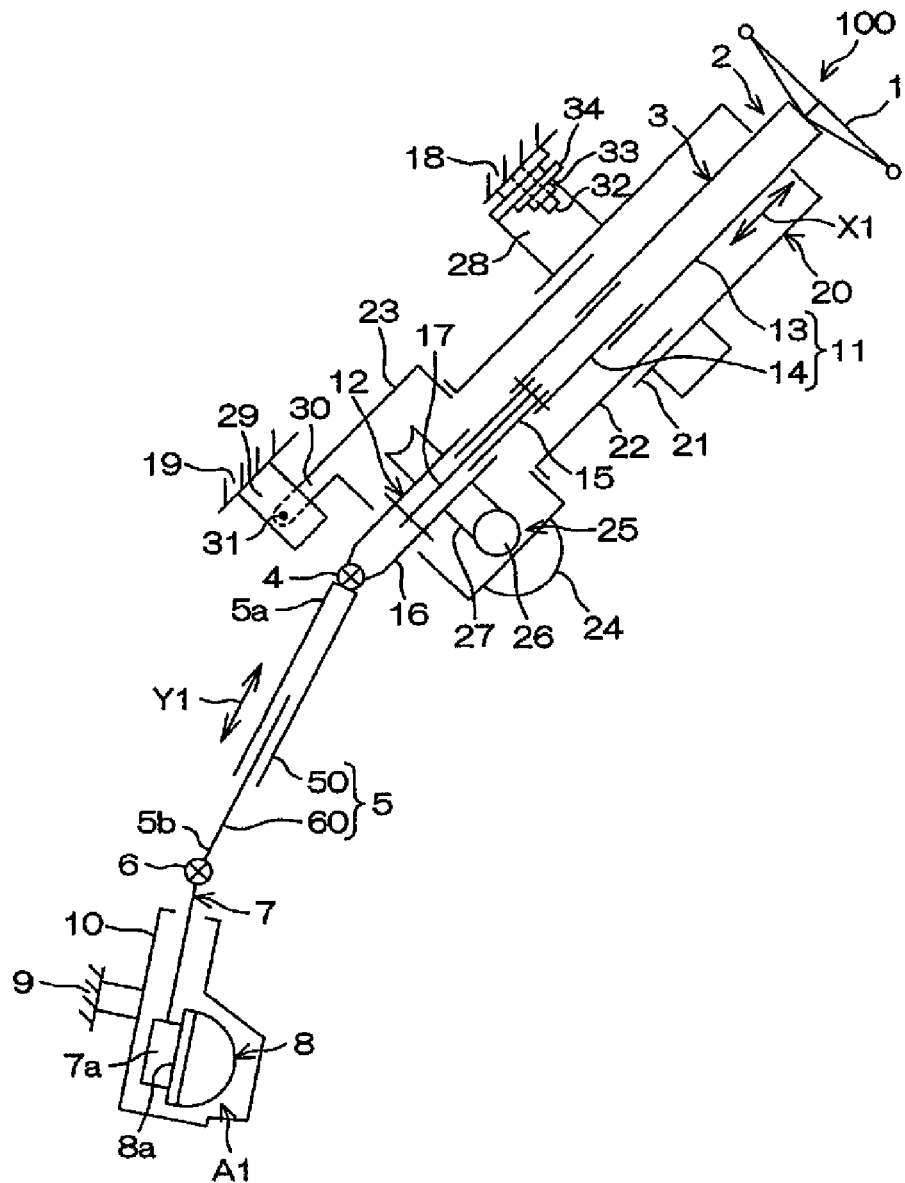
FIG. 1 is a schematic sectional view of a steering device that includes a spline telescoping shaft of an embodiment of the invention as an intermediate shaft, showing a schematic configuration of the steering device.

FIG. 1 is a schematic view showing a schematic configuration of a steering device 100 in which a spline telescoping shaft of an embodiment of the invention is applied to an intermediate shaft 5 that makes up part of a steering shaft 2. Referring to FIG. 1, the steering device 100 includes a steering member 1 such as a steering wheel, a steering mechanism A1 that operates in association with the operation of the steering member 1 to turn wheels (not shown) and the steering shaft 2 that transmits a steering force of the steering member 1 to the steering mechanism A1.

The steering shaft 2 includes a column shaft 3 that is connected to the steering member 1 and the intermediate shaft 5 that is connected to the column shaft 3 via a universal joint 4.

The steering mechanism A1 makes up a rack and pinion mechanism that includes a pinion shaft 7 that is connected to the intermediate shaft 5 via a universal joint 6 and a rack shaft 8 that extends in an axial direction (a direction that is normal to a surface of a sheet of paper on which FIG. 1 is drawn) along a left-to-right direction of a vehicle.

A pinion 7a that is provided near an end portion of the pinion shaft 7 meshes with a rack 8a provided on the rack shaft 8. The rotation of the pinion shaft 7 is transformed into an axial movement of the rack shaft 8. The rack shaft 8 is supported so as to move in the axial direction by a housing 10 that is fixed to a vehicle body side member 9. Although not shown, end portions of the rack shaft 8 are connected to corresponding wheels via corresponding tie-rods and corresponding knuckle arms.

The column shaft 3 includes a first column shaft 11 that can be extended and contracted in an axial direction and a second column shaft 12 that is connected to the first column shaft 11 coaxially. The first column shaft 11 has an outer shaft 13, which is, for example, an upper shaft, and an inner shaft 14, which is, for example, a lower shaft, and the outer shaft 13 and the inner shaft 14 are fitted together by the use of spline fitting so as not only to rotate together but also to slide in an axial direction X1 only when an impact is absorbed.

In this embodiment, the outer shaft 13 will be described as being an upper shaft, and the inner shaft 14 will be described as being a lower shaft. However, the outer shaft may be a lower shaft, and the inner shaft may be an upper shaft.

The second column shaft 12 has an input shaft 15, an output shaft 16 and a torsion bar 17. The input shaft 15 is connected to the inner shaft 14 so as to rotate together. The output shaft 16 is connected to the first end portion 5a of the intermediate shaft 5 via the first universal joint 4 so as to transmit torque thereto. The torsion bar 17 connects the input shaft 15 and the output shaft 16 so as to rotate relatively. On the other hand, a second end portion 5b of the intermediate shaft 5 is connected to the pinion shaft 7 via the second universal joint 6 so as to transmit torque thereto.

The column shaft 3 is supported rotatably via bearings, not shown, by a steering column 20 that is fixed to vehicle body side members 18, 19.

The steering column 20 includes a tubular upper jacket 21 and a tubular lower jacket 22 that are fitted together so as to move relatively in the axial direction X1, and a housing 23 that is connected to an axial lower end of the lower jacket 22. A speed reduction mechanism 25 is accommodated in the housing 23, and this reduction mechanism 25 decelerates the power of a steering assisting electric motor 24 for transmission to the output shaft 16.

The speed reduction mechanism 25 has a driving gear 26 that is connected to the electric motor 24 so as to be simultaneously rotatable with a rotation shaft (not shown in the drawings) of the electric motor 24, and a driven gear 27 that meshes with the drive gear 26 to simultaneously rotates together with the output shaft 16. The drive gear 26 is made up of a worm shaft, for example, and the driven gear 27 is made up of a worm wheel, for example.

The steering column 20 is connected to the vehicle body side members 18, 19 via a rear upper fixed bracket 28 and a front lower fixed bracket 29, respectively.

A lower column bracket 30 that is fixed to the housing 23 of the steering column 20 is supported rotatably on the lower fixed bracket 29 that is fixed to the vehicle side member 19 via a tilt center shaft 31. By adopting this configuration, the steering column 20 and the steering shaft can rotate (tilt) about the tilt center shaft 31 as a fulcrum. This enables the position of the steering member 1 to be adjusted (a so-called tilting adjustment).

The upper fixed bracket 28 is fixed to the vehicle body side member 18 using a fixing bolt (a stud bolt) 32 that projects downwards from the vehicle body side member 18, a nut 33 that is screwed on to the fixing bolt 32 and a capsule 34 that is detachably held to the upper fixed bracket 28.

A distance bracket, not shown, is fixed to the upper jacket 21 of the steering column 20. The position of the steering column 20 is fixed to the vehicle body whereby the position of the steering member 1 is fixed in place by the distance bracket and the upper fixed bracket 28 being locked together via a locking mechanism, not shown.

The intermediate shaft 5, which is a spline telescoping shaft, includes a tubular outer shaft 50, which is, for example, an upper shaft, and an inner shaft 60, which is, for example, a lower shaft. The inner shaft 60 is spline fitted in the outer shaft 50 so as not only to slide relatively in an axial direction Y but also to rotate together.

Figure 2:
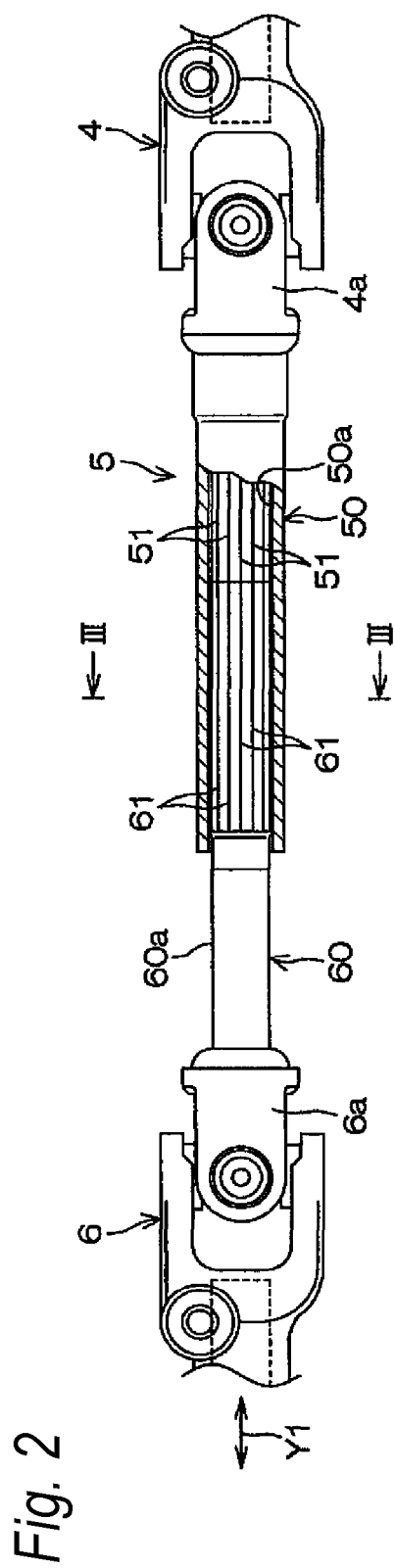
FIG. 2 is a schematic sectional view taken along an axial direction of the intermediate shaft.

As shown in FIG. 2, a plurality of male splines 61 (external splines) are provided on an outer circumference 60a of the inner shaft 60, and a plurality of female splines 51 (internal splines) are provided on an inner circumference 50a of the outer shaft 50 so as to mesh with the male splines 61 in an alternate fashion. In FIG. 2, both the splines 51, 61 are shown schematically.

In the case of the spline telescoping shaft constituting the intermediate shaft 5, as shown in FIG. 2, a yoke 6a of the universal joint 6 is attached to one end of the inner shaft 60. A yoke 4a of the universal joint 4 is attached to one end of the outer shaft 50.

In this embodiment, the inner shaft 60 will be described as being a lower shaft, and the outer shaft 50 will be described as being an upper shaft. However, the inner shaft may be an upper shaft, and the outer shaft may be a lower shaft.

As shown in FIG. 3 that is a sectional view taken along a line III-III in FIG. 2, the female splines 51 that are the internal splines of the outer shaft 50 and the male splines 61 that are the external splines of the inner shaft 60 mesh with each other in the alternate fashion.

In relation to a radial direction of the spline telescoping shaft (the intermediate shaft 5), tips 61T of the male splines 61 confront roots 51B of the female splines 51, and roots 61B of the male splines 61 confront tips 51T of the female splines 51.

A resin film 70 is formed on surfaces of the male splines 61 of the inner shaft 60. The resin film 70 is formed by the use of a synthetic resin. As this synthetic resin, it is possible to raise thermoplastic resin such as polyamide and polyacetal and thermosetting resin such as epoxy resin, for example.

In this embodiment, although the resin film 70 is described as being provided on the surfaces of the male splines 61 of the inner shaft 60, the resin film 70 should be provided on the surfaces of at least either of the male splines on the inner shaft and the female splines on the outer shaft.

Figure 4A:
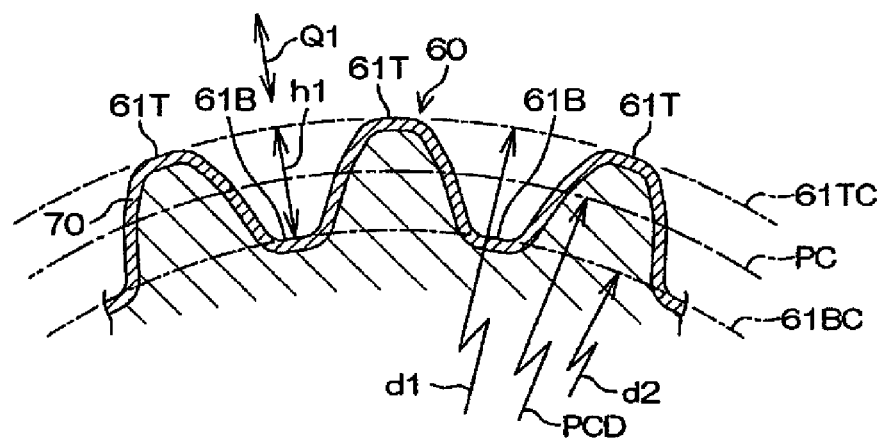
FIG. 4A is an enlarged sectional view of a main part of an internal shaft.
Figure 4B:
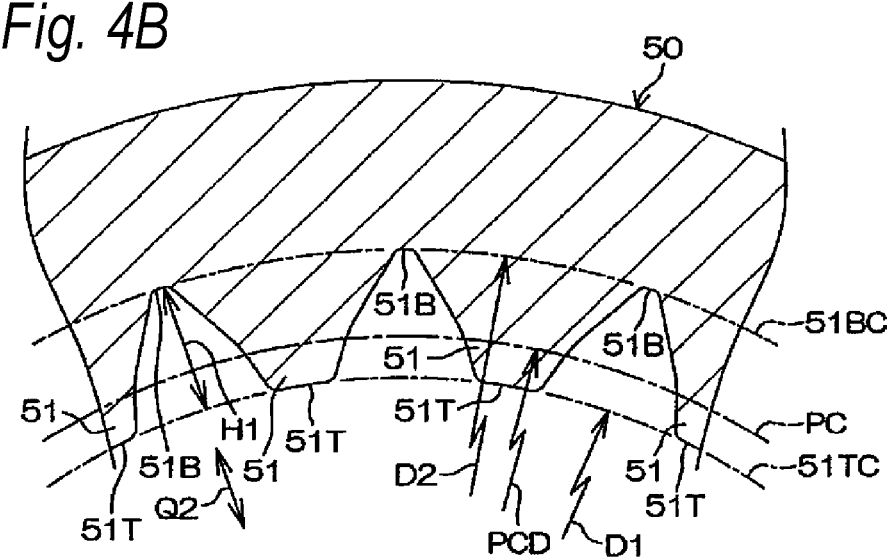
FIG. 4B is an enlarged sectional view of a main part of an external shaft.

The female spline 51 and the male spline 61 have individually profiles that are modified with an addendum modification coefficient "e" in tooth depth directions Q1, Q2 (refer to FIGS. 4A, 4B).

When assuming that the number of teeth of the splines 51, 61 is referred to as Z and a module is referred to as m, in relation to a tip circle diameter d1 and a root circle diameter d2 of the male spline 61 shown in FIG. 4A and a tip circle diameter D1 and a root circle diameter D2 of the female spline 51 shown in FIG. 4B, the following expressions (1) to (6) are established.

$$m(Z+4)>d1>m(Z+2) \quad (1)$$

$$mZ>d2>m(Z-1) \quad (2)$$

$$m(Z+4)>D2>m(Z+2) \quad (3)$$

$$mZ>D1>m(Z-1) \quad (4)$$

$$D2>d1 \quad (5)$$

$$D1>d2 \quad (6)$$

The tip circle diameter d1 of the male spline 61 is a diameter of a tip circle 61TC which connects the tips 61T of the male splines 61, and the rood circle diameter d2 of the male spline 61 is a diameter of a root circle 61BC which connects the roots 61B of the male splines 61.

The tip circle diameter D1 of the female spline 51 is a diameter of a tip circle 51TC which connects the tips 51T of the female splines 51, and the rood circle diameter D2 of the female spline 51 is a diameter of a root circle 51 BC which connects the roots 51 B of the female splines 51.

As shown in FIG. 3, a reference pitch circle diameter PCD (refer to FIGS. 4A, 4B) that is a diameter of a reference pitch circle PC of both the splines 51, 61 will be expressed by a general expression (7) below. A value of the addendum modification coefficient "e" will be expressed by an expression (8) below with a modification in a direction in which the thickness is increased referred to as plus or positive.

$$PCD=mZ \quad (7)$$

$$0.4<e<1.1 \quad (8)$$

As shown by the expression (5), the root circle diameter D2 of the female spline 51 is greater than the tip circle diameter d1 of the male spline 61 (D2>d1), and therefore, as shown in FIG. 3, a gap is provided between the tip 61T of the male spline 61 and the root 51 B of the female spline 51. As shown by the expression (6), the tip circle diameter D1 of the female spline 51 is greater than the root circle diameter d2 of the male spline 61 (D1>d2), and therefore, as shown in FIG. 3, a gap is provided between the tip 51T of the female spline 51 and the root 61B of the male spline 61.

According to the invention, in relation to the inner shaft 60, the root circle diameter d2 of the male spline 61 is substantially the same as the conventional example as shown by the expression (2), and the tip circle diameter d1 of the male spline 61 is made greater than the conventional example [d1=m(Z+2)] as shown by the expression (1), whereby a tooth depth h1 of the male spline 61 is increased. In relation to the outer shaft 50, the tip circle diameter D1 of the female spline 51 is substantially the same as the conventional example as shown by the expression (4), and the root circle diameter D2 of the female spline 51 is made greater than the conventional example [d2=m(Z+2)] as shown by the expression (3), whereby a tooth depth H1 of the female spline 51 is increased. By doing so, with the reference pitch circle diameter PDC shown by the expression (7) kept substantially the same as the conventional example, a contact area between both the splines 51, 61 can be increased. Consequently, it is possible to realize the spline telescoping shaft (the intermediate shaft 5) that can transmit high torque with the strength thereof ensured without an increase in size.

The profiles of the splines 51, 61 are modified with the addendum modification coefficient shown by the expression (8), and therefore, there is no such situation that tips 51T, 61T are so pointed that they are difficult to be worked. Namely, with the addendum modification coefficient "e" being equal to or smaller than 0.4 (e≤0.4), the tip 51T becomes so pointed that it becomes difficult to work the mating root 61B. With the addendum modification coefficient "e" being equal to or greater than 1.1 (e≥1.1), the tip 61T becomes so pointed that it becomes difficult to work the mating root 51B. Consequently, the addendum modification coefficient "e" is set to fall within the range (0.4<e<1.1) shown by the expression (8).

Here, from the expressions (1), (2), the tooth depth h1 of the male spline 61 satisfies the following expression (9).

$$2.5m>h1>m \quad (9)$$

From the expressions (3), (4), the tooth depth H1 of the female spline 51 satisfies the following expression (10).

$$2.5m>H1>m \quad (10)$$

In this way, the tooth depth h1 of the male spline 61 and the tooth depth H1 of the female spline 51 can be increased.

Thus, it is possible to realize the steering device 100 that is small in size and strong in strength and that can transmit high torque.

The invention is not limited to the embodiment that has been described heretofore, and hence, the steering spline telescoping shaft may be applied to the first column shaft 11 of the steering shaft. In addition to that described above, various alterations or modifications can be made thereto without departing from the scope of claims of the invention.

Industrial Applicability

According to the invention, it is possible to provide the steering spline telescoping shaft that can transmit high torque while ensuring the strength thereof without an increase in size and the steering device that includes this shaft.

REFERENCE SIGNS LIST

100: steering device
1: steering member
2: steering shaft
5: intermediate shaft (steering spline telescoping shaft)
11: first column shaft
13: outer shaft
14: inner shaft
50: outer shaft
51: female spline
51T: tip
51TC: tip circle
51B: root 51BC: root circle
60: inner shaft
61: male spline
61T: tip
61TC: tip circle
61B: root
61BC: root circle
A1: steering mechanism
d1: tip circle diameter (of male spline)
70: resin film
d2: root circle diameter (of male spline)
D1: tip circle diameter (of female spline)
D2: root circle diameter (of female spline)
e: addendum modification coefficient
h1: tooth depth (of male spline)
H1: tooth depth (of female spline)
m: module
PC: reference pitch circle
PCD: reference pitch circle diameter
Q1: tooth depth direction (of male spline)
Q2: tooth depth direction (of female spline)
Y1: axial direction (of spline telescoping shaft)

The invention claimed is:

1. A steering spline telescoping shaft that transmits steering torque, comprising:
   an inner shaft and a tubular outer shaft that are spline fitted together so as to slide in an axial direction,
   wherein the outer shaft includes a female spline,
   wherein the inner shaft includes a male spline that fits in the female spline,
   wherein a resin film is provided on a surface of at least either of the female spline and the male spline,
   wherein the female spline and the male spline each have a profile that is modified in a tooth depth direction with an addendum modification coefficient "e", and
   wherein following expressions (1) to (8) are met:

$$m(Z+4) > d1 > m(Z+2) \tag{1}$$

$$mZ > d2 > m(Z-1) \tag{2}$$

$$m(Z+4) > D2 > m(Z+2) \tag{3}$$

$$mZ > D1 > m(Z-1) \tag{4}$$

$$D2 > d1 \tag{5}$$

$$D1 > d2 \tag{6}$$

$$PCD = mZ \tag{7}$$

$$0.4 < e < 1.1 \tag{8}$$

wherein, in the expressions (1) to (8), Z is a number of teeth of each spline, m is a module, PCD is a reference pitch circle diameter, d1 is a tip circle diameter of the male spline, d2 is a root circle diameter of the male spline, D1 is a tip circle diameter of the female spline, and D2 is a root circle diameter of the female spline.

2. A steering device comprising:
   a steering member;
   a steering mechanism configured to operate in association with the operation of the steering member to turn wheels; and
   a steering shaft configured to transmit a steering force of the steering member to the steering mechanism,
   wherein a part of the steering shaft includes the steering spline telescoping shaft according to claim 1.

* * * * *